US009424592B2

(12) United States Patent
Neal et al.

(10) Patent No.: US 9,424,592 B2
(45) Date of Patent: *Aug. 23, 2016

(54) FIRST PARTY ADVERTISEMENT SERVING

(71) Applicant: TruEffect, Inc., Westminster, CO (US)

(72) Inventors: Greg Neal, Evergreen, CO (US); Glynne Casteel, Westminster, CO (US); Ron Hill, Broomfield, CO (US); Bruce Droste, Westminster, CO (US)

(73) Assignee: TRUEFFECT, INC., Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/666,265

(22) Filed: Mar. 23, 2015

(65) Prior Publication Data

US 2015/0262235 A1  Sep. 17, 2015

Related U.S. Application Data

(60) Continuation of application No. 14/022,794, filed on Sep. 10, 2013, now Pat. No. 8,990,330, which is a division of application No. 13/019,158, filed on Feb. 1, 2011, now Pat. No. 8,583,749, which is a continuation of application No. 11/450,490, filed on Jun. 9, 2006, now Pat. No. 7,904,520.

(60) Provisional application No. 60/689,725, filed on Jun. 9, 2005, provisional application No. 60/689,510, filed on Jun. 9, 2005.

(51) Int. Cl.
*G06F 15/16* (2006.01)
*G06Q 30/02* (2012.01)
*H04N 21/234* (2011.01)
*H04N 21/81* (2011.01)
*G06F 21/62* (2013.01)

(52) U.S. Cl.
CPC ........ *G06Q 30/0255* (2013.01); *G06F 21/6263* (2013.01); *G06Q 30/02* (2013.01); *G06Q 30/0277* (2013.01); *H04N 21/23424* (2013.01); *H04N 21/812* (2013.01)

(58) Field of Classification Search
CPC .................. G06Q 30/0255; G06F 21/6263
USPC .......................................... 709/206
See application file for complete search history.

(56) References Cited

U.S. PATENT DOCUMENTS

| 6,345,288 | B1 * | 2/2002 | Reed et al. | 709/201 |
| 6,757,710 | B2 * | 6/2004 | Reed | 709/203 |
| 8,583,749 | B2 | 11/2013 | Neal et al. | |
| 2003/0149581 | A1 | 8/2003 | Chaudhri et al. | |
| 2003/0226142 | A1 | 12/2003 | Rand | |
| 2005/0033641 | A1 * | 2/2005 | Jha et al. | 705/14 |
| 2006/0218035 | A1 * | 9/2006 | Park et al. | 705/14 |
| 2006/0248452 | A1 * | 11/2006 | Lambert et al. | 715/513 |
| 2006/0287936 | A1 * | 12/2006 | Jacobson | 705/35 |

* cited by examiner

Primary Examiner — Arvin Eskandarnia
(74) Attorney, Agent, or Firm — Dinsmore & Shohl LLP

(57) ABSTRACT

Adservers with the ability to access advertiser cookies and vice versa when both are serving from the advertiser's domain are provided, thereby avoiding the overhead and delay in backend cookie synchronization efforts. Further, advertising cookie data can be gathered regardless of whether a user is browsing a publisher's web site with an advertisement served by an adserver, or browsing the advertiser's web site, because the cookies were previously set when the user visited the advertiser's web site in the context of a first-party cookie. Even if the user has configured his or her browser to limit the setting of third-party cookies, the cookies can still be read by the adserver. By making cookie and advertising data immediately available in real time to both the advertiser and the adserver, the solution also provides for instantaneous and accurate targeting of web advertising to allow an educated ad selection process by either party.

21 Claims, 5 Drawing Sheets

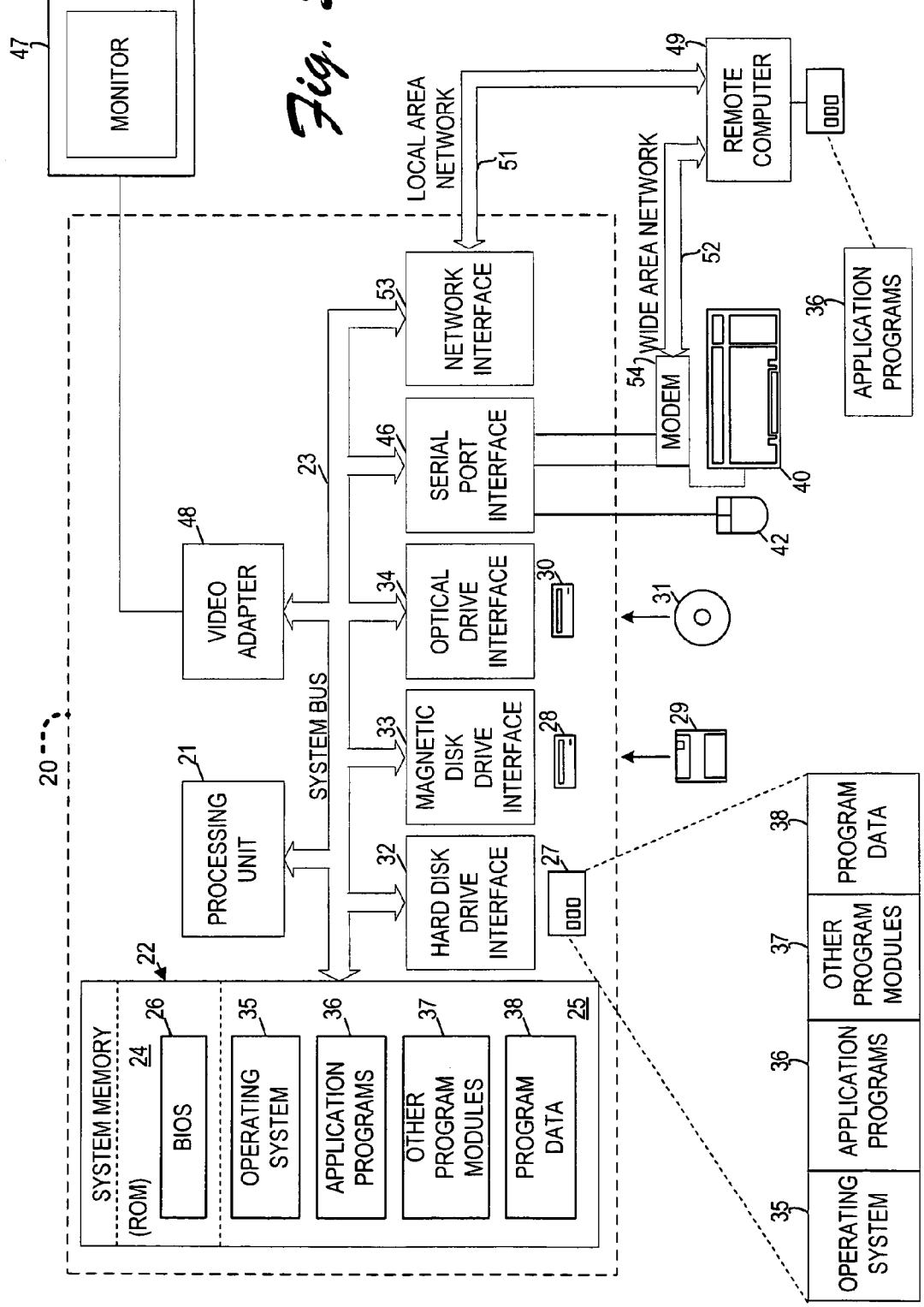

FIRST PARTY ADVERTISEMENT SERVING

CROSS-REFERENCE TO RELATED APPLICATIONS

This application is a continuation of U.S. application Ser. No. 14/022,794 filed Sep. 10, 2013 which is a division of U.S. application Ser. No. 13/019,158 filed Feb. 1, 2011, entitled "First Party Advertisement Serving," (the '158 application), now patented as U.S. Pat. No. 8,583,749 on Nov. 12, 2013, which is a continuation of U.S. application Ser. No. 11/450,490, filed Jun. 6, 2006, entitled "First Party Advertisement Serving," (the '490 application), now patented as U.S. Pat. No. 7,904,520 on Mar. 8, 2011, which claims the benefit of U.S. provisional patent application No. 60/689,725 entitled "First party advertisement serving" and filed on Jun. 9, 2005 (the '725 application) and U.S. provisional patent application No. 60/689,510 entitled "Cookie-less third party advertisement serving" and filed on Jun. 9, 2005 (the '510 application). Each of the '158, '490, '725 and '510 applications is incorporated by reference in their entirety as if fully set forth herein.

BACKGROUND

This invention relates generally to computer software and systems, and more particularly to methods for serving advertising via a network, such as the Internet.

Third party advertisement serving on the Internet arose as a method for advertisers to use third parties to deploy web-based advertising and to measure and validate the quantity and quality of advertisements served by a web site. Existing "cookie" technology was adapted in order to enable accurate measurement of the number of unique web page views and click-throughs. Cookies are small text files created and subsequently read by browsers, such as Internet Explorer, Netscape Navigator, Firefox, and Safari. The browser sends an existing cookie along with a web page request to a web server. If a cookie does not already exist on the web browser, the web server can use a browser's cookie facility to set a cookie and store data therein. A web server might store information, such as access date, domain name, customer type, and activity type.

If a browser views a web page served by a web server that uses cookies, one or more cookies are set to the browser's local repository. Because of the design of the underlying web server/browser technology, when the browser returns to the previously viewed web page at some future time, the web server that originally set the cookie automatically retrieves a copy of the cookie and can then modify it and send it back to the web browser. Additionally, if a cookie was originally set by a web server, the server's domain is granted future access to the cookie even if the browser does not return to the original web server.

As an illustrative example, suppose an advertiser's web site is visited by a web browser, "Browser A." The advertiser is a company called "Company Name," and the company has its own domain, web server, and web site. The domain of Company Name is ".companyname.com." When Browser A views the Company Name web site, the advertiser's web server sets a cookie to Browser A. Browser A then leaves the Company Name web site and visits other web sites, including a web page on a publisher site, "http://website2.com." Generally, a publisher web site is one that presents one or more different types of content and offers advertisement or banner space therewith. An advertiser can "rent" the banner space from the publisher and can serve advertisements directly from its own web server, or it can arrange to have a third-party company, an "adserver," serve the advertising. In this example, the advertiser has arranged for an adserver to serve the advertising for the web site. Thus, the publisher's web site, "www.website2.com," contains a banner ad that is served by the adserver. The adserver has its own domain, for example, ".adserver.com." If Browser A is configured to accept third-party cookies, the adserver's web server can set a cookie to Browser A.

Whenever a browser has a cookie that is associated with a particular domain, it will send the cookie to the web server within the domain along with any request for web content from the web server. In other words, once a web server has set a cookie on a browser, the browser will send the cookie to the web server unless the browser is specifically set to block the cookie. When a web server receives a cookie, it is available to be written into log files on the server. Even if a web server is set to ignore incoming cookies and take no action based on their content, it still receives the cookies and can log them. Thus, both adservers' and advertisers' web servers have difficulties avoiding their own cookies.

There are two additional facets to web page, web server, and cookie technologies that should be understood. First, the web site listed in a browsers uniform resource locator (URL) address bar may not be serving the entire web page that the browser is displaying. Instead, the various components that make up the web page can be served by different web servers. An individual user could point a web browser to a publisher's web page, for example, that has a frame across the bottom in which an adserver displays an advertisement. Both the publisher's web server and the adserver's web server may set cookies to the user's browser (unless the user has enabled third party cookie blocking. Second, cookies set to a particular web server domain are available to be read by any web server in the domain or sub-domain thereof. For example, Company has a web server "Alpha" that serves a web page from the domain ".company.com" and sets cookie "A" to a particular computer user's browser. When the user subsequently directs her browser to a web page served from the domain ".server2.company.com," a second company web server "Beta" serves the second web page. Since the web server Beta has a domain under the domain of web server Alpha (web server Beta's domain is called a sub-domain of web server Alpha's domain), each time the web server Beta receives a web page request, it will receive any cookie previously written to the requesting browser by the web server Alpha.

Delivering an advertisement to a browser through an adserver that uses cookies to serve, track, and measure the advertisements that were purchased has advantages. Advertisers use adservers because of the features and benefits they provide, including: counting and measurement of ad performance regardless of the web site on which the advertising appears; independent verification of advertising views and click-throughs; and web-wide, site agnostic implementation, reporting, and measurement of all web-based advertising. However, downsides to using an adserver include the following: third party cookies of the adserver can be blocked by a user or may even be deleted by anti-spyware programs, advertising data gained from adserver cookies is not readily available to the advertiser, the advertiser has to wait until it receives data (e.g., log file data) from the adserver, or the adserver has to build a real-time cookie synchronization process. The reverse is also true; the adserver has to wait to receive log file data from the advertiser or build a real-time cookie synchronization process before the adserver can target advertisements based on customer variables (e.g., customer=high value) that were recently changed by the advertiser. Additionally, a disadvantage of many current cookie synchronization processes is that they are unidirectional as opposed to shared cookie implementation in which data can be shared bi-directionally.

Although much cookie usage can be relatively innocuous, some uses can raise serious privacy concerns as web servers can use cookies to recognize and track web viewing habits of a particular browser. Because data concerning web viewing habits can be valuable, a person's browsing history can be a commodity that is bought and sold. The privacy concerns thus raised by cookie usage have created a backlash among the Internet using populace, causing many users to disable or otherwise limit the cookie features of their browsers. By limiting cookie technologies, browsers are unable to view and access the full content and features of the cookie-enabled web sites.

Because of this backlash against cookie use, the advertising industry is under increasing pressure in some situations to avoid cookie technologies, however, the industry still desires to continue enjoying the efficiencies and benefits of using adservers without the added burden of customer's privacy being intruded upon. Furthermore, because many adservers have created cookies in the past, even if they stop using cookies now, they would still receive and cannot avoid reading any previously created cookies along with any new web pages requests. There is therefore a need, in these situations, for a solution that avoids cookie technologies while still allowing advertisers to use adservers and reap the benefits thereof.

SUMMARY

Implementations described and claimed herein address the foregoing problems by providing adservers with the ability to access advertiser cookies and vice versa when both are serving from the advertiser's domain, thereby avoiding the overhead and delay in backend cookie synchronization efforts. Further, advertising cookie data can be gathered regardless of whether a user is browsing a publisher's web site with an advertisement served by an adserver, or browsing the advertiser's web site, because the cookies were previously set when the user visited the advertiser's web site in the context of a first-party cookie. Even if the user has configured his or her browser to limit the setting of third-party cookies, the cookies can still be read by the adserver. By making cookie and advertising data immediately available in real time to both the advertiser and the adserver, the solution also provides for instantaneous and accurate targeting of web advertising to allow an educated ad selection process by either party.

In another implementation, adservers are provided with the ability to avoid creating cookies through the use of "virgin domains." Virgin domains include new domains that have either never existed or have never served cookies. Adservers, advertisers, and publishers can purchase new domains from domain registrars, such as GODaddy.com or Network Solutions. In one implementation, for example, a database of domain names is cross-checked to ensure virgin status of the any contemplated domain. In another implementation, an audit of the domain registrars is completed to verify virgin status. In yet another implementation, a series of log files are maintained and used to audit a domain's status to ensure that it is a virgin domain. Adservers within verified virgin domains can thus serve content and any cookies that were previously created in other domains are not passed to the web servers within the virgin domains.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

FIG. 5 illustrates an example system that may be useful in implementing the described technology.

DETAILED DESCRIPTIONS

Figure 1:
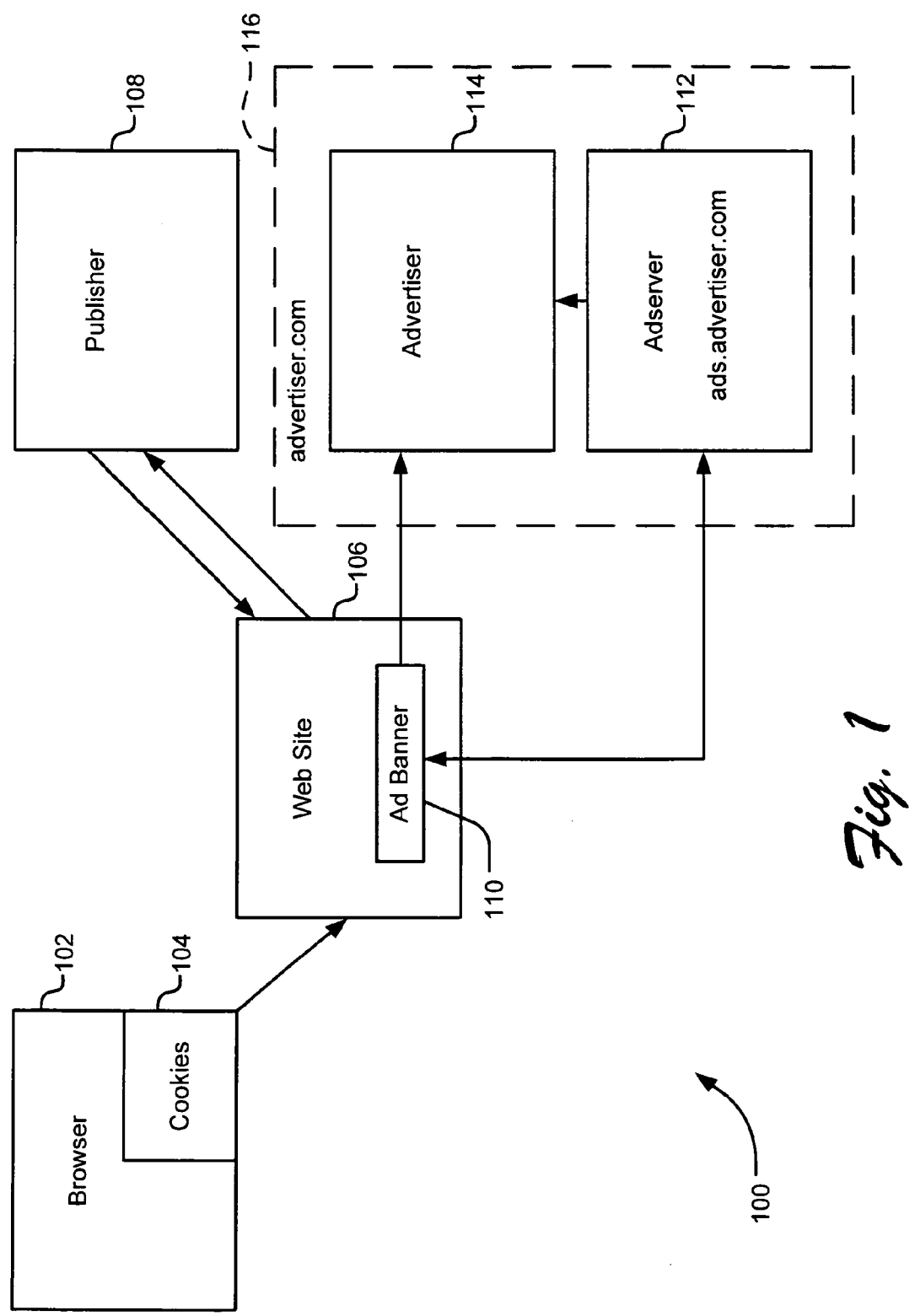
FIG. 1 illustrates an example of a first party advertisement serving environment.

A first party advertisement serving environment in which an adserver shares a domain of an advertiser is provided. Since the adserver shares the advertiser's domain, the adserver has first party access to cookies set by the advertiser and can thus read and write to the advertiser's cookie data set on a user's browser. Even if the user has blocked the use of third party cookies via his browser security settings, the adserver can read and write to first party cookies of the advertiser without being blocked by the security settings. Further, such first party cookies of an advertiser are less likely to be considered spyware and blocked or deleted by an anti-spyware program. Thus, the adserver operating within the domain of the advertiser can provide advertisement services that might not be available to a third party adserver.

In one implementation, for example, an advertiser provides access to one of its sub-domains to an adserver. The adserver can then serve web pages and components of web pages (for example, advertisements) from the sub-domain to which it was granted access by the advertiser. Thus, a cookie originally written by a web server of the advertiser is available to be read and written to by a web server of the adserver. A computer user who modifies browser options in order to block the setting of third party cookies will not block the reading of cookies by a sub-domain because the cookies were set in the first party context on the advertiser's site.

In another implementation, the environment includes a web browser, an advertiser web site having an associated domain and web server, a first party cookie, a publisher web site, and an adserver serving advertisements into the publisher web site. When the browser accesses the advertiser web site, the associated web server sets the first party cookie to the browser. At some time later, when the browser accesses the publisher web site that contains advertisements served by the adserver, the browser sends the advertiser's cookie to the adserver and requests an advertisement. The adserver receives cookies because the adserver's domain is a sub-domain of the advertiser's domain. The adserver reads the cookie and based on the cookie value sends the requested content back to the browser. Further explanation of this process can be found in RFC 2109 entitled HTTP State Management Mechanism.

In yet another implementation, the use and deployment of web servers and cookie technology is structured so that the advertiser's Customer Relationship Management (CRM) system can fully utilize the real time data gathered and shared by both the advertiser and the adservers through shared cookies. Because both the advertiser and the adserver read and write to the same cookies, data can be shared in real-time. Delays caused by current methods of periodically synchronizing adserver and advertiser data (e.g., overnight cookie synchronization) are eliminated or at least reduced.

In one implementation, the adserver that is serving web advertising from within an advertiser domain is not limited to serving advertisements depicting the primary advertiser. Instead, the adserver can serve advertisements from one or more other companies (or fourth parties). If the fourth parties have pre-existing relationships with the advertiser (e.g., marketing partnerships, cross-selling agreements, joint ventures, etc.) both the advertiser and fourth parties can reap the extra benefits of having the fourth party advertisements be served from within a sub-domain of the advertiser.

In another implementation, the adserver can serve e-mail advertising via the first party domain of the advertiser. The e-mail advertisements originate from within the domain of the advertiser, which may be a trusted e-mail provider of its customers. The e-mail advertisement may thus be delivered as a trusted or approved e-mail message directly to an in-box of its customers instead of being blocked by spam filtering.

In yet another implementation, a virgin domain is set up by an adserver. A web server is configured within a virgin domain and no set-cookie options are selected. Thus, because no cookies will be created in the future—and no cookies were previously created by any web server within this virgin domain—the virgin domain remains free of cookies as does any advertising served from the virgin domain. A cookie-less advertisement serving environment has therefore been created for the adserver. Although no cookies are used, the environment still provides for the impression and click reporting functions on the performance of advertisements, which can be used in further advertising selection.

FIG. 1 illustrates a block diagram of an example system 100 showing first party advertisement serving. In this implementation, a user operates a web browser 102 that includes one or more cookies 104. The web browser 102 may be resident on any digital media addressable device, such as but not limited to a personal computer, a laptop computer, a handheld device (e.g., a cell phone, an MP3 player, a blackberry, a personal data assistant), or the like. The user directs the browser 102 to a web site 106, such as "www.website.com," via the browser 102. The web site 106 is served by a publisher 108, which is responsible for the overall content of the web site 106. The browser 102 sends a request to the publisher 108 for content of the web site 106 served by that publisher 108. The publisher 108 serves the web site 106 by providing content for at least a portion of the site. As described above, if one or more of the cookies 104 had previously been set by the publisher 108, the one or more of the cookies 104 set by the publisher 108 is forwarded to the publisher 108 along with the request.

In the implementation shown in FIG. 1, the web site 106 also includes a banner advertisement 110 served by an adserver 112. The adserver 112 is associated with at least one advertiser 114 and provides advertisements in the banner 110 on behalf of the at least one advertiser 114. One or more other components of the web site may be served by a content provider other than the publisher 108, such as another advertiser or other content provider.

The adserver 112 shares a domain 116 with the advertiser 114. In this implementation, the advertiser has a domain 116 of "advertiser.com," and the adserver 112 is assigned a sub-domain of the advertiser's domain, i.e., "ads.advertiser.com." Since the adserver 112 shares the domain of the advertiser 114, the adserver 112 has first party access to a cookie that has previously been set by the advertiser 114. Thus, if the user has previously made a purchase on a web site published by the advertiser 114, the advertiser site may have set a cookie on the user's browser 102 identifying the user as a customer. The browser 102 then sends a copy of the cookie set by the advertiser 114 to the adserver 112 along with a request for content for the banner advertisement 110.

There are various methods by which an advertiser 114 can provide sub-domain access to an adserver 112. In one implementation, for example, the advertiser 114 uses its domain name service (DNS) servers to delegate or redirect sub-domain DNS requests to adserver DNS servers. This process is called DNS delegation. This can be accomplished by creating Name Server (NS) records in the advertiser DNS servers that point to the adserver DNS server. Further explanation of this process can be found in RFC1591. In another implementation, the advertiser 114 can point their host name to the adserver's Internet Protocol (IP) address by means of an Address Record (or "A Record") in the advertiser DNS servers. In yet another implementation, the adserver's hardware and software are co-located within the advertiser's infrastructure or co-located on the same network as the advertiser's infrastructure.

When an adserver DNS server receives a redirect, it takes the logical name of a sub-domain sent from the advertiser DNS server (e.g., "ads.companyname.com") and resolves it into an adserver IP address. For example, "ads.companyname.com" would be resolved into an IP address, such as "216.150.209.230." A browser request for the web site "ads.companyname.com" travels to the advertiser DNS server and then to the adserver DNS server. The adserver DNS server would return the IP address "216.150.209.230" to the browser. After receiving the associated IP address, the browser sends any cookies associated with the domain ".advertiser.com" along with the web page request to the associated IP address. One advantage of DNS delegation, for example, is that it can seamlessly integrate with an adserver's existing proprietary solutions for load-balancing and fail-over of advertisement serving.

The adserver 112 receives the request to serve the advertiser banner 110 and determines an advertisement for displaying in the banner 110. The adserver 112, for example, may determine an appropriate content for the advertising banner 110 depending upon at least one value of a cookie received from the browser 102. When the adserver 112 receives and reads a cookie 104 accompanying a browser request, for example, the adserver 112 may recognize cookie values identified for advertisement selection that the advertiser's web server originally placed in the cookie. For example, if an advertiser's web server recognizes that a particular customer who is visiting the advertiser's web site is a high value customer, the web server then sets a cookie 104 to the customer's browser 102 containing the domain ".advertiser.com" and the data "Target=high_value." The advertiser 114 previously communicated with an adserver 112 to convey the rule that whenever the adserver 112 encounters cookie data with "Target=high_value," the adserver 112 should recognize that it is dealing with a high value customer of the advertiser 114 and should serve advertising appropriate to such a customer. Each time the customer visits the "www.advertiser.com" web site, the "Target" cookie value can be reset by the advertiser's web server to reflect the customer's current value status. For instance, the customer may be a "medium_value" customer when he first accesses the advertiser's web site, but then makes a large purchase. The advertiser's web server can update the customer's status to "high_value" and then reset the cookie information accordingly. If the customer's browser 102 subsequently interacts with the adserver's web server, the updated cookie value will instantaneously cause a "high_value" advertisement to be returned from the adserver's web server to the customer's browser 102.

While the adserver 112 is serving web advertising from within the domain 116 of the advertiser 114, the adserver 112 may not be not limited to serving advertisements on behalf of the primary advertiser 114. Instead, the adserver 112 can serve advertisements from one or more other companies (or fourth parties). If the fourth parties have pre-existing relationships with the advertiser 114 (e.g., marketing partnerships, cross-selling agreements, joint ventures, etc.) both the advertiser 114 and fourth parties can reap the extra benefits of having the fourth party advertisements be served from within a sub-domain of the advertiser 114.

If the user clicks on or otherwise selects the advertisement in the banner 110, the user's browser is directed to a web site of the advertiser 114, which is located within the advertiser's domain "advertiser.com."

Figure 2:
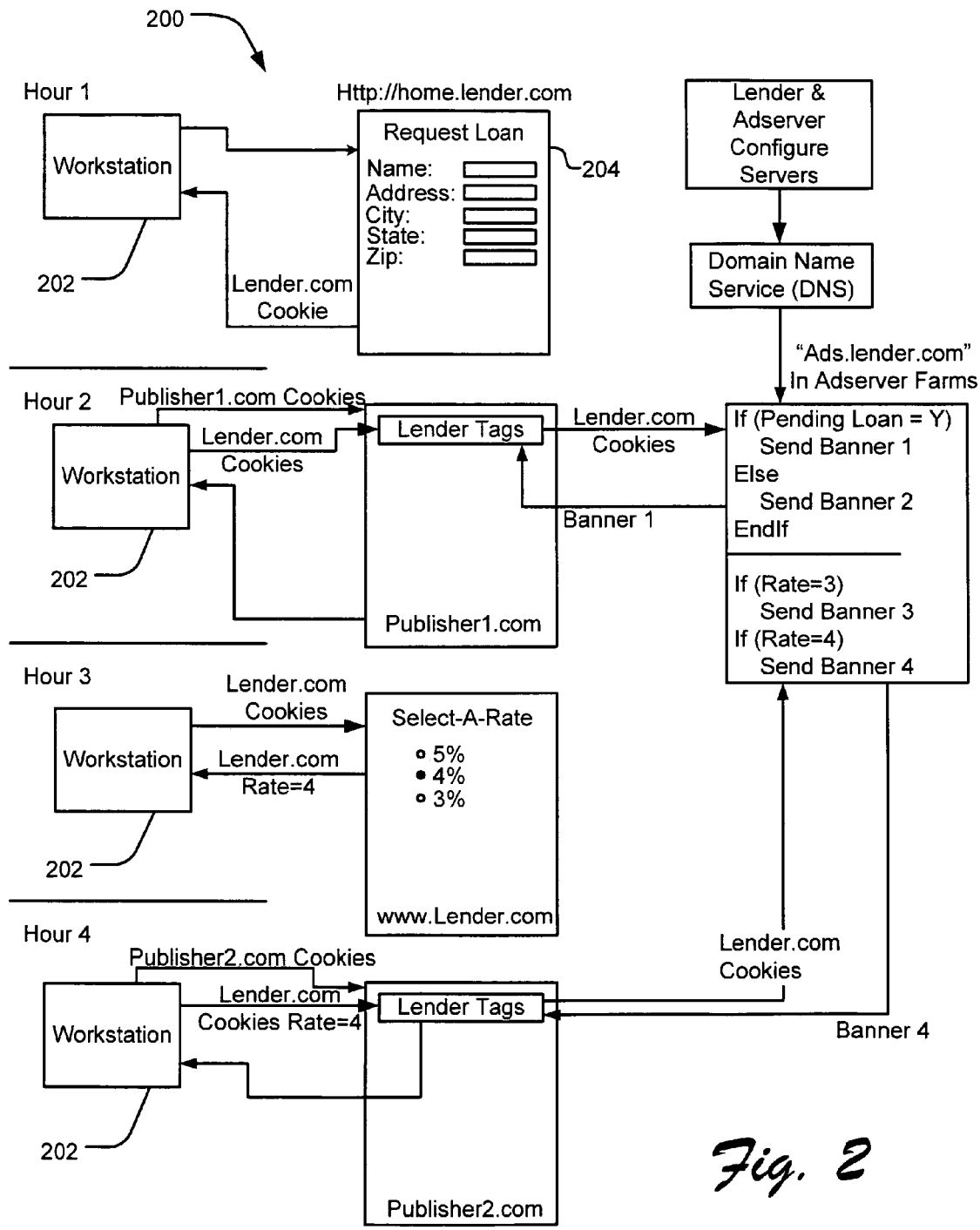
FIG. 2 illustrates another example of a first party advertisement serving environment.

FIG. 2 illustrates another example of a first party advertisement serving environment 200. The figure includes three columns. The first column includes four representations of a computer workstation 202 representing a computer user and a web browser. Although a workstation is shown in FIG. 2, the browser can be running from any browser-capable device, including, but not limited to: a personal digital assistant (PDA), a mobile telephone, a notebook computer, a desktop computer, and the like. Proceeding from the top of the page to the bottom, each representation of the workstation represents the same workstation, but at a later time. For example, the first workstation representation might occur in Hour 1, the second in Hour 2, etc. The second column includes representations of a web site 204 that the browser in column 1 is viewing at a given time. The third column contains representations of the configurations of the advertiser "Lender" and the adserver "Adserver" configuration of the Domain Name Service (DNS) servers, and the implementation of the rules that the Adserver web server uses to respond to banner advertisements on a publisher's web site.

Continuing the above example, in Hour 1 a user directs her web browser to the "home.lender.com" web site. She then completes a "Request Loan" web form and the Lender web server sets a cookie on her browser containing the completed information. Lender, the advertiser, enters into an arrangement with Adserver to serve banner advertisements on publisher web sites "publisher1.com" and "publisher2.com." Lender and Adserver configure their servers and DNS servers according to an implementation described above. Adserver has a domain of "ads.lender.com" that is a sub-domain of the advertiser Lender's domain "lender.com." In Hour 2, the user directs her browser to the publisher's web site "publisher1.com" that includes a banner advertisement for Lender that is served by Adserver. Because the user's browser already contains a cookie for the domain lender.com created in Hour 1 by the lender web server, the cookie is sent by the browser to the Adserver web server along with a request for the banner advertisement. The Adserver web server reads the cookie and recognizes that the customer has a pending loan application. In response, the Adserver web server sends "Banner 1" advertisement back to the web browser.

In Hour 3, the user visits "lender.com" again and this time selects a rate of 4%. This information is added to the "lender.com" cookie by the Lender web server. In Hour 4, the user directs her browser to the second publisher web site "publisher2.com," which also contains a Lender banner advertisement. The browser sends the lender.com cookie to the Adserver web server requesting the banner advertisement. The Adserver web server reads the cookie and recognizes the rate of 4% as set by the Lender web server in Hour 3. In response, the Adserver web server sends "Banner 4" back to the web browser.

Figure 3:
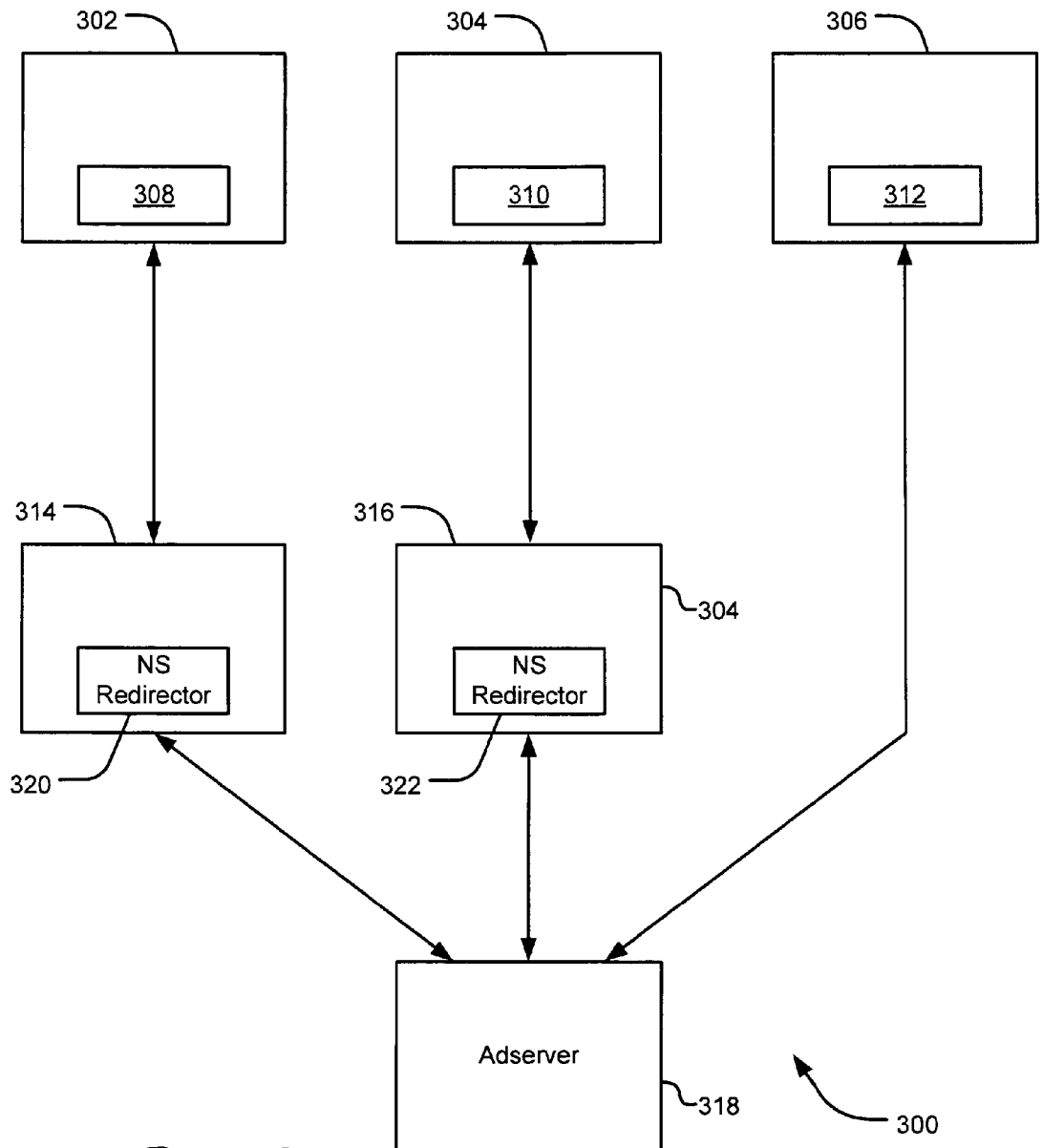
FIG. 3 illustrates yet another example first party advertisement serving environment.

FIG. 3 illustrates yet another example first party advertisement environment 300. In this implementation, the environment 300 includes a plurality of web sites 302, 304, and 306. Each of the web sites 302, 304, and 306 are hosted by a publisher (e.g., CNN, MSN, and yahoo). Further, two of the web sites 302 and 304 include a component 308 and 310 served by advertisers 314 and 316, respectively. The web site 302, for example, includes a banner advertisement 308 served by an advertiser 314, such as "Advertiser 1". The third web site 306 includes a component 312, which is served by a third party adserver 318.

Thus, when a user directs her browser to the web site 302, the web site includes a link directing the browser to an address within the logical domain of the advertiser 314 to retrieve an advertisement for the banner advertisement 308. If the domain of "Advertiser 1" is ".advertiser1.com," for example, the web site might include a link to a sub-domain of Advertiser 1, such as "ads.advertiser1.com." To retrieve the advertisement information for the banner advertisement 308, the browser sends a request to the "ads.advertiser1.com" sub-domain. The request is forwarded to a DNS server associated with the "advertiser1.com" domain, which includes a name server (NS) redirector 320. The NS redirector 320 directs the request to a DNS server associated with the adserver 318, which in turn resolves the sub-domain "ads.advertiser1.com" to an IP address of the adserver 318. As described above, the adserver 318 shares the domain of the advertiser 314 and thus has first party access to read and write to cookie data stored on the user's browser as if the adserver 318 were the advertiser 314.

Similarly, web site 304 includes a banner advertisement 310 and a link to a logical domain of another advertiser 316 (e.g., "Advertiser 2") to retrieve an advertisement for the banner advertisement 310. If the domain of Advertiser 2 is ".advertiser2.com," for example, the web site 304 might include a link to a sub-domain of Advertiser 2, such as "ads.advertiser2.com." To retrieve the advertisement information for the banner advertisement 310, the browser sends a request to the "ads.advertiser2.com" sub-domain. The request is forwarded to a DNS server associated with the "advertiser2.com" domain, which includes a name server (NS) redirector 322. The NS redirector 322 redirects the request to a DNS server associated with the adserver 318, which in turn resolves the sub-domain "ads.advertiser2.com" to an IP address of the adserver 318. Alternatively, another adserver may service the banner advertisement 310 on behalf of Advertiser 2. Since the adserver 318 shares the domain of the advertiser 314 as well as the advertiser 316, the adserver 318 thus has first party access to read and write to cookie data stored on the user's browser as if the adserver 318 were both the advertisers 314 and 316.

A third web site 306 includes another banner advertisement 312 and a link directly to the adserver 318 to service the banner advertisement 312 on the web site 306. In this manner, the adserver 318 acts as a typical third party adserver on behalf of the web site 306. Thus, the adserver 318 shown in FIG. 3 acts as a first party advertisement service for the web pages 302 and 304, but acts as a third party advertisement service for the web page 306.

In one particular implementation, the adserver 318 may also support secure socket layer (SSL) protocol (e.g., HTTPS://) to at least one of the advertisers 314 and 316. By sharing the logical domain of the advertiser, the adserver can use a certificate of the advertiser to enable SSL communication. The advertiser, for example, may purchase an SSL certificate for the sub-domain "ads.advertiser.com" and supply the adserver with the certificate to match the sub-domain delegated to the adserver and the parent domain of the advertiser.

Figure 4:
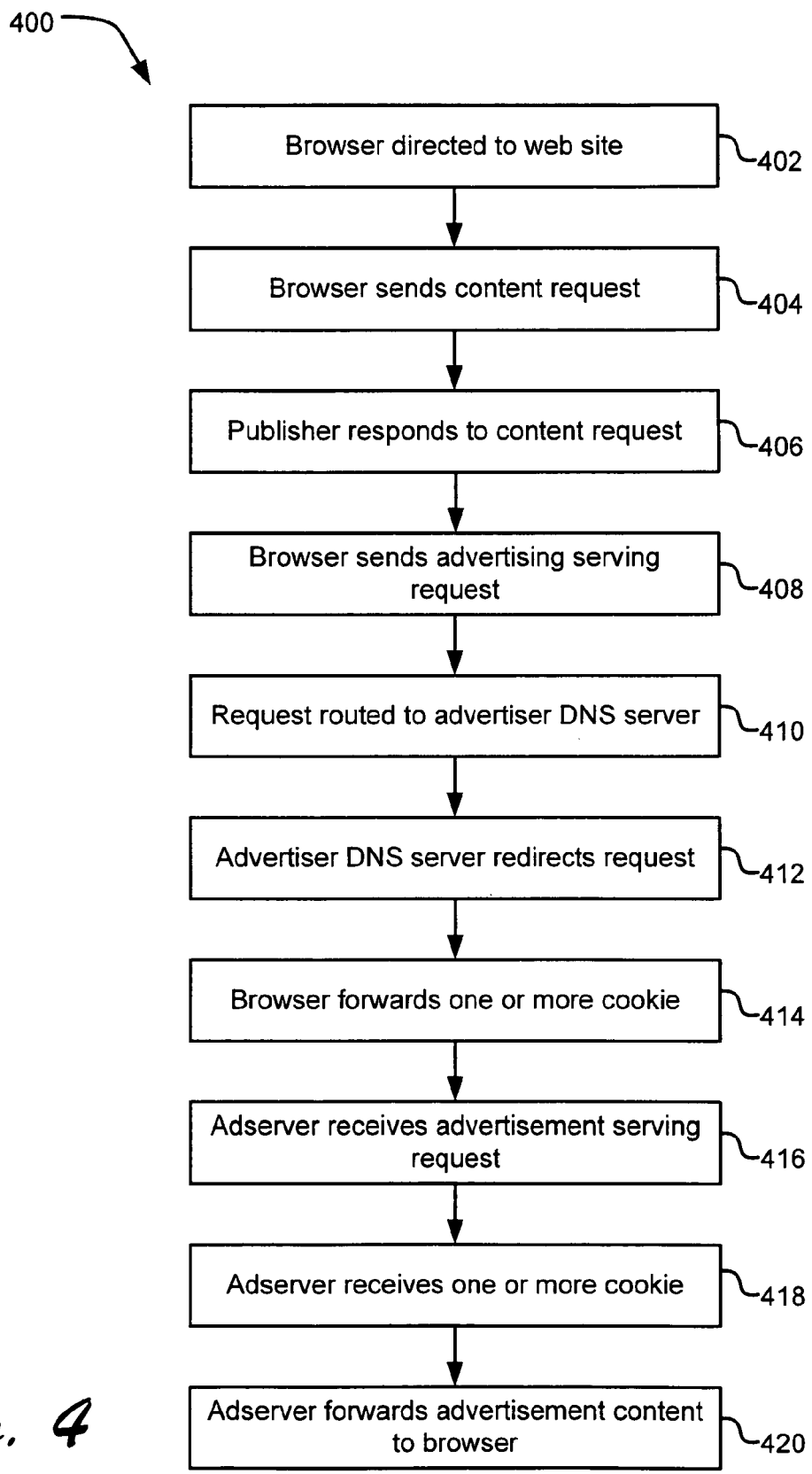
FIG. 4 illustrates example operations of a method of serving an advertisement.

FIG. 4 illustrates example operations 400 of a method of serving an advertisement. A user directs a browser to a web site hosted by a publisher and including a component such as a banner advertisement served by an adserver in operation 402. The user may, for example, enter a uniform resource locator (URL) or an Internet Protocol address in the browser to direct the browser to a desired web site. The web site includes a link to the publisher for retrieving content for the web site and a link to the adserver to retrieve an advertisement for a component of the web site, such as a banner advertisement. When the browser accesses the web site, the browser sends a content request to the publisher via the link from the web site for content in operation 404. The publisher responds to the content request by providing content for the web site to the browser in operation 406.

The browser also sends an advertisement serving request directed to a sub-domain of an advertiser via the link to request advertising content in operation 408. The request is routed to a DNS server of a parent domain of the advertiser in operation 410. The DNS server redirects the advertisement serving request to a DNS server of the sub-domain that is associated with the adserver serving the banner advertisement of the web site in operation 412. As described above, infrastructure associated with the sub-domain may be co-located with infrastructure of the parent domain of the advertiser, may be co-located on a private network, may be accessible via a public network (e.g., the Internet), or the like.

The advertisement serving request may be redirected by a DNS server of the parent domain of the advertiser in a number of ways. In one implementation, for example, DNS delegation is used in which a name server (NS) record in the DNS server points to a DNS server of the adserver. In this manner, the advertisement serving request directed to the sub-domain is received by the DNS server of the advertiser and forwarded to the adserver via an NS record that points to a DNS server of the adserver. The following example instructions could be added, for example, to a domain zone file for a domain "advertiser.com" under which an advertiser wants its first party cookies to be served.

| ; Sub-domain Delegation | | | |
|---|---|---|---|
| ads | IN | NS | ns1.advertiser.com |
| ads | IN | NS | ns2.advertiser.com |
| ads | IN | NS | ns3.advertiser.com |

In this implementation, the sub-domain "ads.advertiser.com" would be assigned to the adserver, which would assign IP addresses of its system to the name "ads."

In another implementation, the DNS server of the parent domain of the advertiser utilizes an Address Record ("A Record") in the parent domain DNS server to point to an address of a server of the adserver, such as pointing directly to an Internet Protocol (IP) address of the server. Other implementations are also contemplated.

If the browser includes a copy of one or more cookie associated with a domain of the advertiser (e.g., the parent domain, the sub-domain, or another domain of the advertiser), the one or more cookie is forwarded to the adserver in operation 414. The one or more cookie may be forwarded to the adserver along with the advertisement service request or may be forwarded to the adserver separately from the advertisement service request. The adserver may read and write to the cookie as a first party directly associated with the cookie because the adserver shares the domain of the advertiser. Thus, the one or more cookie on the browser may be updated directly by either the advertiser or the adserver without having to synchronize information between the advertiser and the adserver.

The adserver receives the advertisement serving request from the publisher web site in operation 416. The adserver, for example, may receive the advertisement serving request at a DNS server of the adserver after it has been redirected, such as described above with respect to operation 412. The adserver DNS server, in turn, resolves the sub-domain into an address (e.g., an IP address) and forwards the advertisement serving request to a server associated with the address. In another implementation, a server of the adserver may receive the advertisement serving request directly from the DNS server of the advertiser via an address record (A Record) of the advertiser DNS server. Other implementations are also contemplated.

If one or more cookie associated with the parent domain of the advertiser is forwarded from the browser, the adserver also receives the one or more cookie in operation 418. As described above the one or more cookie may be received together with the advertisement service request or may be received separately from the advertisement service request.

The adserver receives the advertisement serving request and the one or more cookie (if applicable) and selects an advertisement from a plurality of advertisements. The adserver, for example, may select the advertisement based at least in part upon a cookie associated with the parent domain of the advertiser. If no cookie is transmitted, however, the adserver may select the advertisement according to other criteria. As described above, the adserver may select an advertisement associated with the advertiser or may select an advertisement on behalf of another party (i.e., a fourth party). The fourth party, for example, may have a cross-marketing agreement in place with the advertiser or may simply be another party unrelated to the advertiser.

The adserver then forwards content for the selected advertisement to the browser in operation 420. In one implementation, for example, the content is forwarded directly from the adserver to the browser via an open socket. Other implementations are also contemplated.

In situations where cookie-less advertising is required or desired, for example, adservers are provided with the ability to avoid creating cookies through the use of "virgin domains." As described above, virgin domains include new domains that have either never existed or have never served cookies. Adservers, advertisers, and publishers can purchase new domains from domain registrars, such as GODaddy.com or Network Solutions.

The virgin status of a particular domain can be verified in a number of manners. In one implementation, for example, a database of domain names is cross-checked to ensure virgin status of the any contemplated domain. In another implementation, an audit of the domain registrars is completed to verify virgin status. In yet another implementation, a series of log files are maintained and used to audit a domain's status to ensure that it is a virgin domain. Adservers within verified virgin domains can thus serve content and any cookies that were previously created in other domains are not passed to the web servers within the virgin domains.

In some circumstances, an adserver may believe a domain qualifies as a virgin domain, but later unexpectedly receives cookies from a browser through the domain. As such, the adserver can detect receipt of the cookies in association with the ostensibly virgin domain and alert administrative personnel. In this manner, the administration personnel can replace the domain with a new truly virgin domain and perform other corrective actions (e.g., the initial domain can be removed from a database of virgin domains). Alternatively, the adserver may take a corrective action to restore the virgin status of the domain by deleting or expiring the cookie received from the browser. In one implementation, for example, the adserver can re-issue the cookie received from the browser and set the "expires" attribute of the cookie to a date in the past. Other implementations are also contemplated.

In another implementation, a browser session is created with HTTP requests and responses that do not contain state information, i.e., cookie data. The session limits the data passed in "Cookie" and "Set-Cookie" commands that normally carry state information between participating web servers and browsers. The stateless session—where no cookie is read or written—is created by a web server residing within a virgin domain.

A fully-qualified host name comprises a host (e.g., "www") and domain name (e.g., ".company.com"). A domain name comprises two or more domain levels (e.g., ".company" is a second level domain and ".com" is a top level domain). In one implementation, a domain name that has never before existed (or existed and has never been used) is set up for the purpose of serving cookie-less advertisements as a virgin domain. Within the virgin domain, any number of fully-qualified host names can be configured and deployed. Generally, a cookie can be state information that passes between an origin server (e.g., a web server) and a user agent (e.g., a browser), and is stored by the user agent. Further information concerning these technologies can be found in the HTTP/1.0 RFC 2109 specification standards.

In another implementation, a virgin domain is set up by an adserver. A web server is configured within a virgin domain and no set-cookie options are selected. Thus, because no cookies will be created in the future—and no cookies were previously created by any web server within this virgin domain—the virgin domain remains free of cookies as does any advertising served from the virgin domain. A cookie-less advertisement serving environment has therefore been created for the adserver. Although no cookies are used, the environment still provides for the impression and click reporting functions on the performance of advertisements, which can be used in further advertising selection.

An example hardware and operating environment is shown in FIG. 5 that may be used for implementing various computing devices in a first party advertisement serving environment. A general purpose computing device is provided in the form of a computer 20 that may, for example, be used as a workstation for executing a browser program or as a server for executing software for an advertiser or adserver. The computer 20 includes a processing unit 21, a system memory 22, and a system bus 23 that operatively couples various system components including the system memory to the processing unit 21. There may be only one or there may be more than one primary processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited. In the illustrated example, an auxiliary processor 48 is also coupled to the system bus 23 to provide processing operation for an auxiliary processing state. In an alternative implementation, the primary processing unit 21 provides both a primary processing mode and an auxiliary processing mode.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A primary display device 47, such as a flat panel display or other type of display device, is also connected to the system bus 23 via a display controller, such as a primary display adapter 48 or an auxiliary display adapter 64. In the illustrated example, a multiplexer 66 switches display signals from the individual display controllers. Alternatively, the display controllers can include components to provide high impedance, such as tri-state buffers, when not signaling the primary display adapter 47. In an alternative implementation, a single display controller may be employed via the primary processing unit 21. In addition to the primary display device 47, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 5. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are examples and other means of and communications devices for establishing a communications link between the computers may be used.

In an example implementation, an operating system, auxiliary applications, primary applications such as a browser, advertiser module, adserver module, or publisher module, and other modules may be embodied by instructions stored in memory 22 and/or storage devices 29 or 31 and processed by the processing unit 21. Auxiliary processing settings, primary processing settings, and other data may be stored in memory 22 and/or storage devices 29 or 31 as persistent datastores.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts described above. Rather, the specific features and acts described above are disclosed as example forms of implementing the claimed subject matter.

What is claimed is:

1. A method of serving an advertisement to a client system, the method comprising:
   receiving an advertisement serving request at a server from a publisher web page directed to an adserver within a delegated sub-domain of an advertiser and redirected within a domain of the advertiser via a domain name service (DNS) server;
   receiving data from the client system set within the domain of the advertiser;
   selecting an advertisement from a plurality of candidate advertisements based at least upon the data set within the domain of the advertiser; and
   providing updated data set within the domain of the advertiser via the delegated sub-domain of the advertiser.

2. The method of claim 1 further comprising serving the advertisement to the client system.

3. The method of claim 1 wherein the advertisement comprises an advertisement of the advertiser.

4. The method of claim 1 wherein the advertisement comprises an advertisement of a second advertiser different from the advertiser.

5. The method of claim 1 wherein the receiving operation further comprises redirecting the advertisement serving request via a name server (NS) record in the DNS server that points to a DNS server of an adserver.

6. The method of claim 1 wherein the receiving operation further comprises redirecting the advertisement serving request via pointing a host name to an address via an address record of the DNS server.

7. The method of claim 6 wherein the address comprises an Internet Protocol address.

8. The method of claim 6 wherein the address comprises an Internet Protocol address.

9. The method of claim 1 further comprising resolving the sub-domain of the advertiser to an address of a server of an adserver.

10. The method of claim 1 wherein the adserver is co-located with the DNS server within an infrastructure of the advertiser.

11. The method of claim 1 wherein the adserver is co-located on a network with the DNS server of the advertiser.

12. A computer-readable medium storing computer-executable instructions for performing a computer process, the computer process comprising:
   receiving an advertisement serving request at a server from a publisher web page directed to an adserver within a delegated sub-domain of an advertiser and redirected within a domain of the advertiser via a domain name service (DNS) server;

receiving data from the client system set within the domain of the advertiser;

selecting an advertisement from a plurality of candidate advertisements based at least upon the data set within the domain of the advertiser; and providing updated data set within the domain of the advertiser via the delegated sub-domain of the advertiser.

13. A computing system comprising:

a domain name service (DNS) server associated with a domain of an advertiser adapted to receive an advertisement serving request from a publisher web page and redirect the advertisement serving request within the domain of the advertiser; and a sub-domain adserver assigned to a sub-domain of the domain of the advertiser, the sub-domain adserver adapted to (a) receive the redirected advertisement serving request via the DNS server, (b) receive data set within the domain of the advertiser from a client system accessing the publisher web page, (c) select an advertisement from a plurality of candidate advertisements based at least upon the data set within the domain of the advertiser; and (d) provide updated data within the domain of the advertiser via the delegated sub-domain of the advertiser.

14. The system of claim 13 wherein the sub-domain adserver is further adapted to serve the advertisement to the client system.

15. The system of claim 13 wherein the DNS server comprises a name server (NS) record pointing to a DNS server of an adserver.

16. The system of claim 13 wherein the DNS server comprises an address record pointing a host name to an address of the sub-domain adserver.

17. The system of claim 16 wherein the address comprises an Internet Protocol address.

18. The system of claim 13 further comprising a sub-domain DNS server adapted to resolve the sub-domain of the advertiser to an address of the sub-domain adserver.

19. The system of claim 18 wherein the address comprises an Internet Protocol address.

20. The system of claim 13 wherein the sub-domain adserver is co-located with the DNS server within an infrastructure of the advertiser.

21. The system of claim 13 wherein the sub-domain adserver is co-located on a network with the DNS server.

* * * * *